United States Patent [19]

Mitchell et al.

[11] 4,250,555
[45] Feb. 10, 1981

[54] SELF-CALIBRATING DATA COLLECTION SYSTEM FOR DYNAMIC WHEEL BALANCING MACHINE

[75] Inventors: Richard A. Mitchell, Milpitas; Hoyt H. Nelson, Santa Clara; Donald R. Sherman, San Jose, all of Calif.

[73] Assignee: Nortron Corporation, Sunnyvale, Calif.

[21] Appl. No.: 5,040

[22] Filed: Jan. 22, 1979

[51] Int. Cl.³ .................... G01M 1/00; G06F 15/20
[52] U.S. Cl. ............................ 364/571; 364/508; 73/462
[58] Field of Search ............... 364/571, 508; 73/462, 73/463–466

[56] References Cited

U.S. PATENT DOCUMENTS

| 3,798,431 | 3/1974 | Schulkind et al. | 364/571 |
|---|---|---|---|
| 3,818,198 | 6/1974 | Walker et al. | 364/571 X |
| 3,822,377 | 7/1974 | Beck | 364/571 X |
| 4,018,087 | 4/1977 | Wenz et al. | 364/508 X |
| 4,044,602 | 8/1977 | Higgs et al. | 364/571 X |
| 4,062,242 | 12/1977 | Brihier | 73/462 |
| 4,068,532 | 1/1978 | Green et al. | 364/508 X |
| 4,085,619 | 4/1978 | Shapiro et al. | 73/462 |
| 4,135,244 | 1/1979 | Davis | 364/508 |
| 4,138,825 | 2/1979 | Pelta | 364/508 X |

Primary Examiner—Edward J. Wise
Attorney, Agent, or Firm—Allegretti, Newitt, Witcoff & McAndrews

[57] ABSTRACT

An information sensing system as used in sensing unbalanced forces acting upon a rotating wheel being balanced is characterized by means for generating a correction factor associated with each wheel balancing operation and determined by feeding a known signal through a given circuit and comparing the output received with the output expected. The correction factor can then be applied to the sensed signals fed through the same circuit. The frequency of the known signal and other signals are both derived from the same source such as the rate of rotation of the wheel.

7 Claims, 7 Drawing Figures

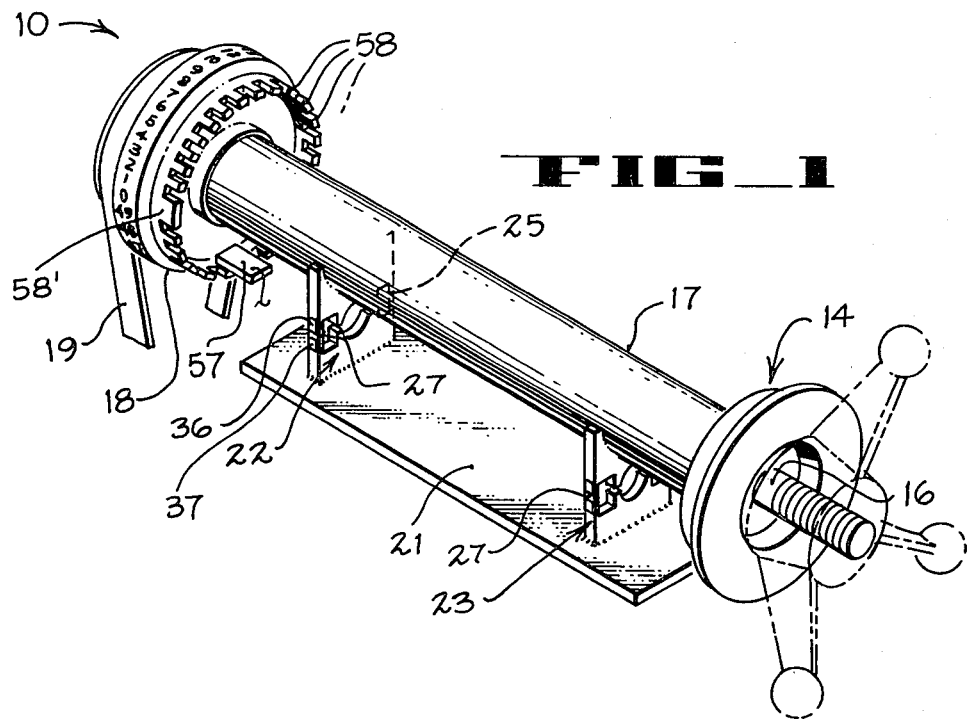
FIG_1
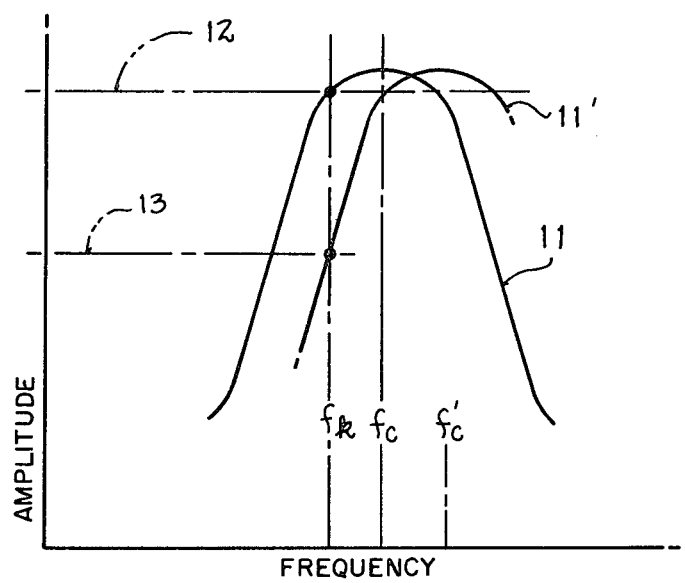
FIG_2

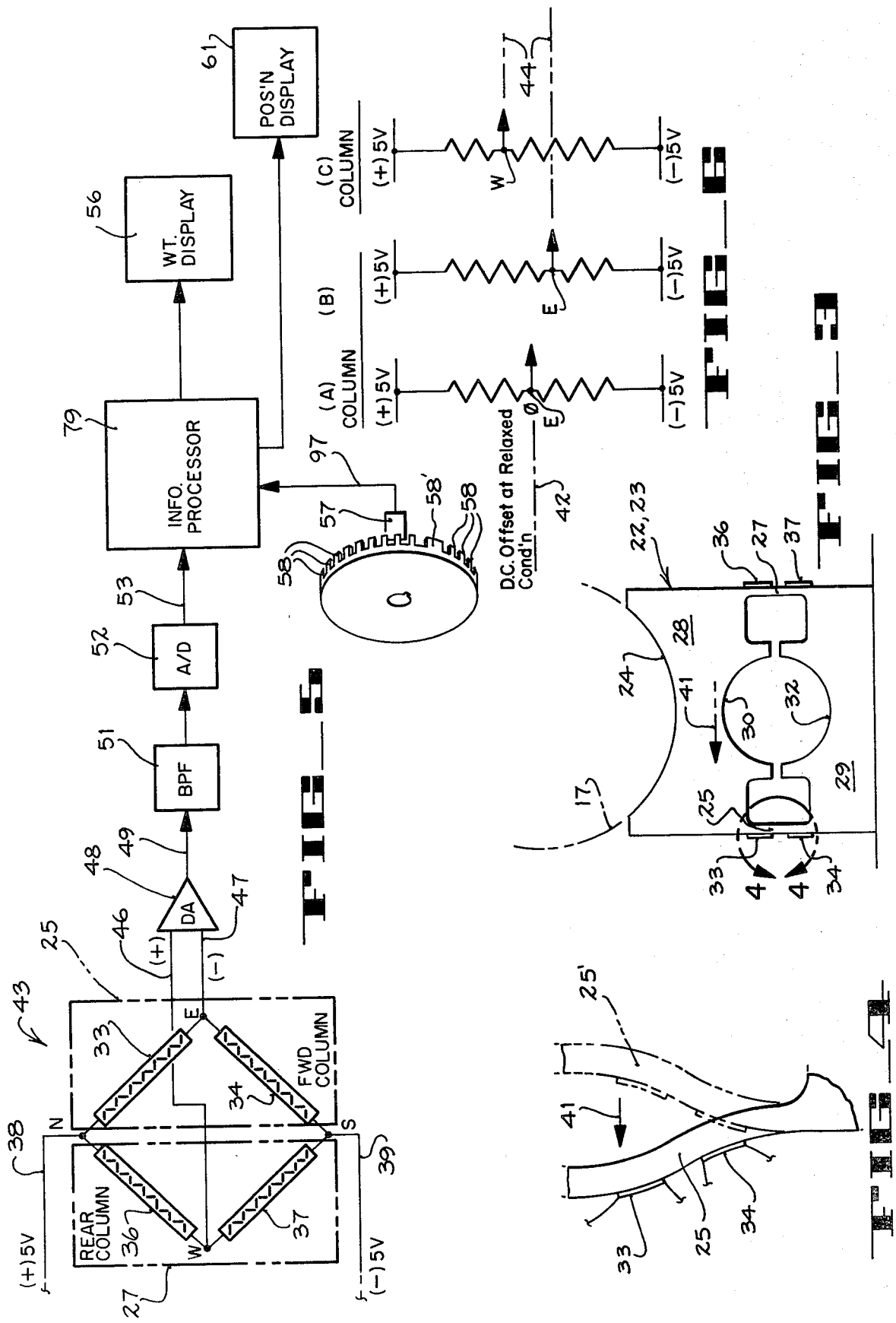

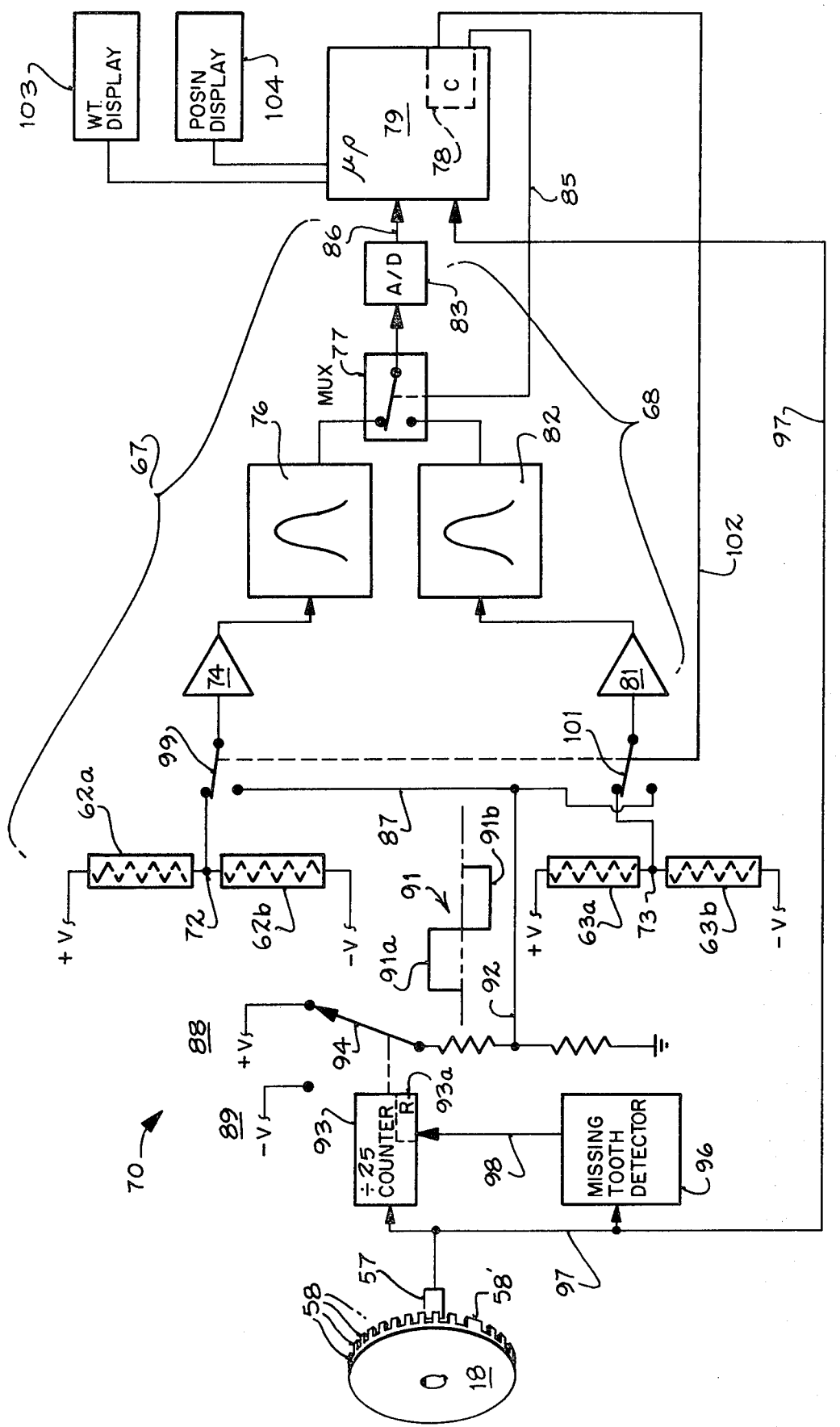

SELF-CALIBRATING DATA COLLECTION SYSTEM FOR DYNAMIC WHEEL BALANCING MACHINE

This invention pertains to a self-calibrating data collection system particularly useful in conjunction with a wheel balancing system of a type employing force transducing means.

Heretofore, in systems for electronically sensing input information to be employed for generating operational results or instructions, it has been necessary that each element of the system function substantially at its precise operating standard so as not to introduce error into the output computations. For example, a given sensing circuit can include filter circuits comprised of certain resistance and capacitance which can vary with age, temperature, input frequency and other conditions. Accordingly, the amplitude, phase, etc. of the output from such circuits will similarly vary and provide inaccurate results.

A way of avoiding erroneous output signals caused by changes in circuit parameters has been to employ active filter circuits which will not vary in phase or amplitude. Such circuits typically employ expensive tuning elements, especially the capacitor elements. These circuits also require periodic manual recalibration to correct for drift, etc. Even if this is done, however, error still can occur due to variation in input frequency representative of inaccurate wheel speed arising from changes in line voltage, wheel size, belt slippage, motor temperature, etc.

The diagram shown in FIG. 2 provides an indication of the critical nature of the foregoing problem. The graph 11 represents the frequency pass characteristics of the filter, amplifier combination having a center frequency of $f_c$. Should the elements forming this filter change so as to move the peak frequency of the filter to the position of graph 11', having a new center frequency $f_c'$, the amplitude of the signal will be sensed at a much lower level, represented by line 13.

Accordingly, it is clear that should the center frequency vary with drift in resistance or capacitance in the filter or other portions of the circuit, significant changes can be introduced to the values of the signals read out by the system for a given input frequency, e.g. $f_k$.

As disclosed herein a signal having a known frequency corresponding to a wheel speed and having a predetermined amplitude is first fed through the circuit and the output derived from this signal is compared to the expected output to determine the degree of change which has been caused by the system. This information can then be used to provide a "correction factor" for correcting signals of unknown phase and amplitude characteristics, whereby all error in the circuit can be compensated for while avoiding the use of expensive components and periodic manual recalibration. Knowing the correction factor permits all unknown signals transmitted via the same circuit to be corrected accordingly to provide an accurate readout for the circuit.

A self-calibrating system according to the present invention as now to be described can best be understood as used in conjunction with a dynamic wheel balancing system of a type in which the amount of counter balancing weight and its position on a rim of the wheel are required to be accurately determined.

FIG. 1 shows a diagrammatic perspective view of a wheel balancing machine for purposes of explanation herein, according to the invention;

FIG. 2 shows a graphical representation of the band pass characteristics of a filter for purposes of explanation;

FIG. 3 shows a diagrammatic side elevation view of a flexure member or support bracket with associated strain gauges;

FIG. 4 shows an enlarged detail diagrammatic view of that portion of FIG. 3 defined by the line 4—4;

FIG. 5 shows a diagrammatic view of one channel of a system for detecting the position and weight to be added;

FIG. 6 shows an explanatory diagram of the functioning of portions of FIG. 5; and FIG. 7 shows a system diagram according to the invention.

In general there is provided herein an information sensing system characterized by means for generating a correction factor determined by feeding a known signal through a given circuit and comparing the output received with the output expected. The correction factor can then be applied to all other signals fed through the same circuit path.

It is a general object of the invention to provide an improved data collection system for a dynamic wheel balancing machine.

It is another object of the invention to provide a self-calibrating data collection system which minimizes the requirement for highly stable (and expensive) components.

It is yet another object of the invention to provide a data collection system for a wheel balancing machine in which all error in a given circuit can be compensated for by using a single correction factor whereby the correction factor when used in conjunction with signals sensed by rotation of a wheel serve to correct the output signals from such wheel rotation.

These and other objects of the invention will become more readily evident from the following detailed description of a preferred embodiment when considered in conjunction with the drawings.

As shown in FIG. 1 a portion of a dynamic wheel balancing machine 10 comprises a wheel mounting chuck 14 carried on one end of a rotatable drive shaft 16. A cylindrical bearing housing 17 contains suitable bearings for supporting drive shaft 16 for rotation therein. Finally, a drive pulley 18 carried on the other end of shaft 16 is rotated by means of the cyclically driven drive belt 19. Pulley 18 may include a cylindrical flange 18a prepared with a sequence of fifty numbers, 0–49 inclusive, adapted to be monitored by the machine operator or an electronic display may be provided.

The foregoing construction is carried upon the upper surface 21 of a support platform and spaced therefrom by means of a pair of flexure members or support brackets 22, 23. The upper edge of each bracket 22, 23 includes a curved surface conforming to the cyclindrical housing 17 welded thereto while the lower edge of each bracket is welded to the top support surface 21.

Brackets 22, 23 as arranged and as described further below serve to constrain movements of driveshaft 16 caused by imbalance forces created during rotation to a predetermined plane. Thus, brackets 22, 23 form flexure means disposed to move in spaced, substantially parallel relation to planes of rotation of the rims of a wheel carried on driveshaft 16.

Inasmuch as each bracket or flexure assembly is substantially the same as the other a description of flexure assembly or bracket 22 will be suitable for a description of both.

Bracket 22 is formed to include an arcuate cradle surface 24 formed in its upper edge for supporting bearing housing 17 welded therein.

Bracket 22 comprises a pair of spaced support columns 25, 27 and a pair of webs 28, 29 extending therebetween in a plane common to each. Webs 28, 29 include opposed semicircular relieved portions 30, 32. Webs 28, 29 are spaced apart so as to permit the upper ends of support colums 25, 27 to flex between advanced and retracted positions in the plane of webs 28, 29.

In this way each of support columns 25, 27 can be subjected to a strain from imbalance forces acting against bearing housing 17 by the rotating wheel and in a plane substantially normal to the support columns as described in greater detail further below.

Each flexure assembly or bracket 22, 23 as shown herein carries transducer means for generating signals in response to forces acting on the flexure assemblies applied in planes spaced substantially parallel to the plane of rotation of the wheel (not shown) carried by chuck 14. Thus, the forces so applied can be detected by the pair of strain gauges 33, 34 carried on support column 25. In order to enhance the signal, a further pair of strain gauges 36, 37 can be carried on support column 27.

Strain gauges 33, 34, 36 and 37 generate signals in response to movement of the upper web 28 carrying the upper ends of each of columns 25, 27 with respect to their lower ends.

Support columns 25, 27 are defined by forming a pair of rectangular openings through each flexure member or bracket 22, 23 in a manner including both webs 28, 29.

The strain gauges herein are constructed in a manner whereby under compression they take on an increased cross-section so as to lower their resistance. Placing them in tension causes them to take on a reduced cross-section so as to increase resistance. For example, as shown in FIGS. 3 and 4, when web 28 moves to the left (in FIG. 3) strain gauge 33 is somewhat "stretched" along the resultant "convex" bend in column 25 to place gauge 33 in tension. On the contrary strain gauge 34 is shown at the same time in compression along the "concave" bend then formed in support column 25.

As shown in FIG. 5 if (+)5 volts is supplied to line 38, (−)5 volts applied to line 39, and lines 38 and 39 connected at points N and S, the voltage at E will theorectically be zero when both strain gauges 33, 34 are in their relaxed positions (with support column 25 standing upright). In practice, a DC offset will occur due to differences in resistance values developed by each specific strain gauge for a predetermined degree of bending.

However, in rotating an unbalanced wheel, forces will act back and forth in a given plane as above described so that, for example, a force acting in the direction of arrow 41 will cause strain gauge 33 to be placed in tension and reduce its cross-section and increase its resistance. By increasing the resistance between points N and E the output point defined between strain gauges 33, 34 at E will be lowered as represented by the voltage divider diagram in FIG. 6(B). Similarly, as support column 25 flexes in an opposite direction to the phantom line position 25' (FIG. 4), the output point E will rise above the mid point shown in FIG. 6A and later drop down again as shown in FIG. 6B as the column flexes in a reverse direction.

It is to be observed in the diagram shown in FIG. 3 that whenever the upper web 28 is moved to the left to place the upper left strain gauge 33 in tension, the upper right strain gauge 36 is placed in compession. Accordingly, by placing upper strain gauge 36 in compression (and its associated lower strain gauge 37 in tension) the resistance in strain gauge 36 will be reduced while the resistance in strain gauge 37 will be substantially increased as represented in FIG. 6C where the output point W has risen above the mid-line 42. Thus, the output at E falls as the output at W rises and vice versa whereby by reading out from bridge 43 at points E and W the varying resistance displacement 44 will be enhanced.

It is to be observed that by using a system of the kind shown in FIG. 5 there will be substantially no increase in noise in the electrical signal and the current will remain constant notwithstanding variations in the imbalance forces acting upon the strain gauges.

While it might be possible to substitute resistances in the bridge 43 of equal value to strain gauges 36, 37 and still obtain an output signal as shown in FIG. 10B, the present output signal is significantly enhanced by employing strain gauges on both support columns 25, 27 in the manner described above so that a more desirable signal is achieved. Thus, the output from bridge 43 appears between leads 46, 47 to be supplied to a differential amplifier 48.

The output from amplifier 48 on line 49 is fed through a band pass filter 51 so as to eliminate signals from any spurious sources. The analog signals from filter 51 are then converted to digital signals by the analog to digital converter 52 so they can be fed via line 53 to a suitable information processor 79 for determining the amount of weight to be added in each of the planes of the wheel rims taken from the force determinations. A display 56 receives this information and displays it for an operator to observe and employ.

The angular position for applying the weight is detected by means of a photosensor 57 disposed to detect the passage of a series of teeth 58 carried by pulley 18. The teeth are counted commencing with a reset position identifiable to the photosensor 57 by means of the elongate tooth 58' which extends approximately the length of two teeth plus the usual gap between. These counting pulses are fed along line 97 to information processor 79. Processor 79, accordingly, generates an output for display means 61 whereby the angular position for adding weight will be indicated.

The rotational position for adding weight can be determined by means as noted in U.S. Pat. No. 3,910,121 or other known means.

In order to calculate the appropriate weight to be added it is necessary to obtain a reading from the strain gauges in the planes of flexure member 22 as well as in the plane of flexure member 23. Accordingly, by taking the information from each of these two spaced planes it is possible for processor 79 to appropriately calculate the information which is necessary to be displayed.

A self-calibrating system whereby error caused by conditions of the system can be determined and applied to the input signals has been shown in FIG. 7. The self-calibrating system 70 serves to generate a correction factor based on feeding a known signal through each of the two channels 67, 68 of the system. The output signal is compared to an expected output to define a correction factor or modification necessary to be made to adjust other output signals to cause them to accurately represent the signal values sensed at the input to the system.

Thus, a single pair of strain gauges 62a, 62 and another pair of strain gauges 63a, 63b are respectively associated with each of a pair of flexure brackets. Each pair of strain gauges provides information transduced or sensed from the movement of its bracket. This information is then transmitted along an associated channel of the system 70 shown in FIG. 7 to a suitable information processor such as a microprocessor 79 programmed in known manner to carry out the functions associated with same as recited herein.

As shown in FIG. 6, as each column 25, 27 is flexed, the voltage at the central take-off point will increase and decrease to vary the output in response to the flexing. Similarly, the center tap 72 or 73 for strain gauge 62 or 63 provides an input signal of unknown value to its associated signal processing channel 67 or 68. Channel 67 comprises a pre-amplifier 74 coupled to a band pass filter 76. The output from band pass filter 76 leads to a multiplex control diagrammatically represented simply as a bi-stable switch 77 responsive to commands from the control section 78 of microprocessor 79 via lead 85.

The other channel 68 also comprises an amplifier 81 and a band pass filter 82 supplying its output to the multiplex control 77. The analog signals from both channels 67, 68 are coupled to multiplex control 77 and directed to an analog to digital converter 83 whenever control 77 has been switched to receive such signals.

Microprocessor 79 receives the digital output from convertor 83 for comparing the output of channel 67 received via input lead 86 and the values of a known signal transmitted over the same channel.

Means for generating a known signal to be supplied to channel 67 via input lead 87 comprises a first and second voltage source 88, 89 each represented as being at a predetermined voltage, +V and −V respectively. Means for periodically switching between these two voltage sources serves to substantially generate a square wave 91 on lead 92 to supply input lead 87 with a known signal. The switching means comprises detector 57 supplying a signal as each tooth 58 passes adjacent same. These signals are fed to a counter 93 arranged to count twenty-five teeth and then transfer switch 94 from one voltage source to the other. Another twenty-five teeth are counted and switch 94 is again transferred. Thus, square wave 91 will include first and second lobes 91a, 91b each of which have a duration equal to one-half a revolution.

A missing tooth detector circuit 96, such as retriggerable monostable multivibrator which is allowed to time out only on the missing tooth, serve to synchronize the "count" in counter 93 with the rotational position of the toothed pulley wheel 18 and hence with the rotational position of the wheel being balanced as carried on the axle supporting the toothed pulley wheel. Thus, circuit 96 is coupled to lead 97 so that upon sensing the missing tooth 58', a signal via lead 98 to the "reset" section 93a of counter 93 serves to reset counter 93 to zero. The pulses representative of sensing each tooth 58 are also carried via lead 97 to serve as an input to microprocessor 79.

Finally, switch means 99, 101 responsive to signals from microprocessor 79 via line 102 are transferred to connect with input lead 87 at the first part of each balance cycle to determine the appropriate correction factor for the mounted tire's rotational frequency.

Lines 85 and 102, while shown as solid lines, serve to provide electronic control of switches 77 and 99/101. The continuation of line 109 between switches 99 and 101 is shown in dashed form to represent the conjoint control between the electronic switches 99/101.

Briefly, microprocessor 79 controls the system in response to the known signal 91 to carry out a procedure whereby the filters operate until they settle and the tire speed becomes constant. Data is taken via lead 86 and thereafter, using this information, a correction factor is computed during the time that switches 99, 101 are transferred to feed tire signals through the same circuit. Subsequently, after allowing time for filter settling, these tire signals are taken and then corrected by the same correction factor.

In operation, after mounting a tire onto chuck 14, the system as described above rotates the tire until it is properly up to speed. Subsequently, reference signal 91 is fed through both amplifier/filter chains 67, 68 until the filters settle. Substantially concurrently, pulses from detector 57 are fed to microprocessor 79 via line 97. Starting from zero tooth 58', microprocessor 79 will count for one-quarter of the total number of teeth. At the start of each quarter revolution or quadrant, readings are taken from input lead 86 representing both channels 67, 68 by virtue of the rapid switching at 77 operated in response to control section 78 of microprocessor 79.

Subsequently, a correction factor is calculated by means of microprocessor unit 79 and stored. While the correction factor is being calculated by the microprocessor, input switches 99, 101 are transferred to couple signals from associated strain gauge assemblies associated therewith and the filters allowed to settle again. Then the signals from the tire movements are sampled for each of four quadrants while the correction, previously calculated from a known reference signal, is applied to the tire signals. As thus arranged the displayed balancing instructions will have been corrected by the amount of the correction factor and then fed to the two displays for weight and position 103, 104.

Thus, there has been provided a self-calibrating system for sensing variable input information to be employed for generating instructions or displaying results. The system generally comprises means for generating first signals at a frequency substantially corresponding to a first rate and at a predetermined amplitude. Means for generating other signals at a frequency substantially corresponding to the first rate and at an amplitude responsive to the degree of variance in the input information sensed supplies the input information. A predetermined channel comprised of electrical components in which the physical operating properties may vary with age, temperature, etc. serves to carry both the first and second signals. Information processing means coupled to receive the first and second signals via the predetermined channel serves to compare the value of the characteristics of the first signals received with their expected values to determine a correction factor for adjusting the characteristics of other signals, such as the second signals transmitted via said channel.

As shown in FIG. 7 the system as described above further comprises means for synchronizing the phase of operation of the processing means 79 to that of the means for generating a first set of signals (such as the "known" signals) appearing on lead 87. The means for synchronizing microprocessor 79 with signals on lead 87 comprises digital pulse generating means represented by teeth 58 and photodetector 57 which counts at the rate of rotation of the wheel. Counter 93 periodically couples one or the other of the two voltage levels 88, 89 to the information channel(s) 67 (or 68). Finally, lead 97 serves to couple both the pulse generating means and the microprocessor 79 in common.

In this manner the timing applied to the "known" pulses 91 also provides the same timing for microprocessor 79. As disclosed herein an improved sensor system has been provided in which the sensors can be strain gauges, for example, or piezo electric elements responsive to pressure, or hall effect devices, or variable reluctance devices, or variable capacitance elements arranged to be for sensing changes in certain conditions such as the movement of the support members caused by imbalance forces acting thereon.

According to another embodiment the "correction factor" can be separated into correction factor for both phase and amplitude. In this embodiment, the same reference signal is introduced into the system in the same manner as in the previously described embodiment. The phase of the output from the circuit is compared with the phase of the expected output and the difference determines the phase correction factor. This correction factor is then used to modify the time at which the reference signal is to be re-sampled.

In so doing correction for phase variation is defined between the actual and expected output signals from the circuit. The second time the reference signal is sampled, the amplitude of the output can be compared to the expected amplitude for determining correction factor.

When the so-called "second" signal (derived from wheel imbalances) is passed through the circuit, it is sampled every quarter revolution at times as modified by the phase correction factor. The amplitude so measured will also be modified by the amplitude correction factors so the signals will then be fully self-calibrated in both amplitude and phase.

From the foregoing it will be readily evident that there has been provided an improved self-calibrating system for use in conjunction with sensing signals whereby variations in such signals as caused by changes in the physical operating properties of the components through which the system operates are monitored to determine a correction factor for adjusting signals by the system.

We claim:

1. In a wheel balancing machine of a type having means for mounting a wheel to be rotated and means for sensing unbalanced forces acting upon the wheel during rotation thereof, a self-calibrating information sensing system comprising means for generating a first signal at a frequency substantially corresponding to the rate of rotation of the mounted wheel and at a predetermined amplitude, means for generating a second signal at a frequency substantially corresponding to the rate of rotation of the mounted wheel and at an amplitude responsive to the degree of unbalanced forces acting upon the wheel, information processing means for receiving said first and second signals via a predetermined channel for comparing the value of characteristics of said first signals received to their expected values to determine a correction factor for adjusting the characteristics of said second signals received via said channel to cause them to have their related corrected values.

2. In a system according to claim 1 further comprising means for synchronizing the phase of operation of said processing means to that of said means for generating said first signals, said means for synchronizing comprising a signal pulse generating means associated with the rate of rotation of the wheel for establishing the frequency for said first signals, a predetermined counter for periodically coupling first and second voltage levels to said predetermined channel, and means coupling said pulse generating means in common to both said counter and said processing means to provide a timing to each.

3. In a wheel balancing machine of a type having means for mounting a wheel to be rotated and means for sensing unbalanced forces acting upon the wheel during rotation thereof, a self-calibrating information sensing system comprising means for generating a first signal at a frequency substantially corresponding to the rate of rotation of the mounted wheel and at a predetermined amplitude, means for generating a second signal at a frequency substantially corresponding to the rate of rotation of the mounted wheel and at an amplitude responsive to the degree of unbalanced forces acting upon the wheel, a predetermined channel adapted to be coupled to carry both said first and second signals, information processing means for receiving said first and second signals via said channel for comparing the value of characteristics of said first signals received to their expected values to determine a correction factor for adjusting the characteristics of said second signals received via said channel to cause the characteristics of said second signals to have their related corrected values.

4. In a wheel balancing machine of a type having means for mounting a wheel to be rotated and means for sensing unbalanced forces acting upon the wheel during rotation thereof, a self-calibrating information sensing system comprising means for generating a first signal at a frequency substantially corresponding to the rate of rotation of the mounted wheel and at a predetermined amplitude, means for generating a second signal at a frequency substantially corresponding to the rate of rotation of the mounted wheel and at an amplitude responsive to the degree of unbalanced forces acting upon the wheel, a predetermined channel adapted to be coupled to carry both said first and second signals, information processing means for receiving said first and second signals via said predetermined channel, switch means having a first and second state for coupling said channel to carry said first or second signals in said first or second states respectively, said switch means being operated by said processing means to first couple said first signals to said channel for comparing the value of characteristics of said first signals to their expected values to determine a correction factor for adjusting the characteristics of said second signals received by said processing means via said channel to cause said second signals to be adjusted to have their related corrected values.

5. In a system for sensing variable input information to be employed for generating instructions or displaying operational results, a self-calibrating information sensing system comprising means for generating first signals at a frequency substantially corresponding to a first rate and at a predetermined amplitude, means for generating second signals at a frequency substantially corresponding to said first rate and at an amplitude responsive to the degree of variance in the input information being sensed, a predetermined channel for carrying both said first and second signals, information processing means coupled to receive said first and second signals via said predetermined channel for comparing the value of characteristics of said first signals received to their expected values to determine a correction factor for adjusting the characteristics of said second signals received via said channel to cause said second signals to have their related corrected values.

6. In a system according to claim 5 further comprising means for synchronizing the phase of operation of said processing means to that of said means for generating said first signals, said means for synchronizing comprising a digital pulse generating means establishing said first rate, a predetermined counter for periodically coupling first and second voltage levels to said channel, and means coupling said pulse generating means in common to both said counter and said processing means to provide timing to each.

7. In a system according to claim 6 further comprising switch means having a first and second state adapted to respectively couple said channel to said first and second signals, said switch means being operated by said processing means to first couple said first signals to said channel for determining said correction factor, said processing means then transferring said switch means to said second state for feeding said second signals to said processor means via said channel for supplying the sensed information to be corrected.

* * * * *